United States Patent
Zhang et al.

(10) Patent No.: US 9,143,974 B2
(45) Date of Patent: *Sep. 22, 2015

(54) METHOD AND DEVICE FOR SENDING A BUFFER STATUS REPORT

(71) Applicant: Huawei Technologies Co., LTD., Shenzhen (CN)

(72) Inventors: Xiaodong Zhang, Shenzhen (CN); Johan Johansson, Stockholm (SE)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 14/322,543

(22) Filed: Jul. 2, 2014

(65) Prior Publication Data

US 2014/0314025 A1 Oct. 23, 2014

Related U.S. Application Data

(63) Continuation of application No. 12/565,255, filed on Sep. 23, 2009, now Pat. No. 8,797,971, which is a continuation of application No. PCT/CN2009/071404, filed on Apr. 22, 2009.

(30) Foreign Application Priority Data

Apr. 26, 2008 (CN) .......................... 2008 1 0066888

(51) Int. Cl.
*H04W 24/10* (2009.01)
*H04W 74/08* (2009.01)
(Continued)

(52) U.S. Cl.
CPC .............. *H04W 24/10* (2013.01); *H04W 72/04* (2013.01); *H04W 72/1284* (2013.01); *H04W 74/0833* (2013.01); *H04W 72/1242* (2013.01)

(58) Field of Classification Search
USPC .............. 370/322, 329, 341, 348, 349, 395.4; 455/69, 70, 509
See application file for complete search history.

(56) References Cited

U.S. PATENT DOCUMENTS

| 2005/0047416 A1 | 3/2005 | Heo et al. |
| 2006/0143444 A1 | 6/2006 | Malkamaki et al. |
| 2009/0113086 A1 | 4/2009 | Wu et al. |

(Continued)

FOREIGN PATENT DOCUMENTS

| CN | 1486579 A | 3/2004 |
| CN | 1992679 A | 7/2007 |

(Continued)

OTHER PUBLICATIONS

Nokia corporation, Nokia Siemens networks "Criteria for Short and Long BSR", 3GPP TSG-RAN WG2 Meeting #60bis, R2-080015, XP050137919, Jan. 14-18, 2008, Sevilla, Spain.*

(Continued)

*Primary Examiner* — Awet Haile
(74) *Attorney, Agent, or Firm* — Brinks Gilson & Lione

(57) ABSTRACT

A method and device of sending Buffer Status Reports (BSRs) includes determining the type priority sequence of BSR by a user terminal, and selecting and processing one BSR based on the type priority. A user device is also provided. In the process of implementing the provided method and device, the terminal may select and process one BSR when the sum of the BSR qualified for triggering the sending and the BSR marked as pending is greater than one.

19 Claims, 1 Drawing Sheet

(51) Int. Cl.
  *H04W 72/12* (2009.01)
  *H04W 72/04* (2009.01)

(56) References Cited

U.S. PATENT DOCUMENTS

| | | | |
|---|---|---|---|
| 2010/0177788 A1* | 7/2010 | Chun et al. | 370/474 |
| 2010/0202420 A1 | 8/2010 | Jersenius et al. | |
| 2010/0254321 A1 | 10/2010 | Kim et al. | |

FOREIGN PATENT DOCUMENTS

| | | |
|---|---|---|
| CN | 101562894 B | 10/2010 |
| EP | 1352540 B1 | 3/2005 |
| KR | 10-2008-0015693 A | 2/2008 |
| WO | WO 2007088465 A2 | 8/2007 |
| WO | WO 2007147431 A1 | 12/2007 |
| WO | WO 2009129740 A1 | 10/2009 |

OTHER PUBLICATIONS

Nokia Corporation, Nokia Siemens Networks: "Criteria for Short and Long BSR", 3GPP TSG-RAN WG2 Meeting #60bis, R2-080015, XP050137919, Jan. 14-18, 2008, Sevilla, Spain, 5 pages.

3GPP TS 36.300 V8.4.0 (Mar. 2008), Technical Specification, 3$^{rd}$ Generation Partnership Project; Technical Specification Group Radio Access Network; Evolved Universal Terrestrial Radio Access (E-UTRA) and Evolved Universal Terrestrial Radio Access Network (U-TRAN); Overall Description; Stage 2 (Release 8), 126 pages.

3GPP TS 36.321 V8.1.0, (Mar. 2008), Technical Specification, 3$^{rd}$ Generation Partnership Project; Technical Specification Group Radio Access Network; Evolved Universal Terrestrial Radio Access (E-UTRA) Medium Access Control (MAC) protocol specification (Release 8), 30 pages.

3GPP TS 36.321 V8.4.0 (Dec. 2008), Technical Specification, 3$^{rd}$ Generation Partnership Project; Technical Specification Group Radio Access Network; Evolved Universal Terrestrial Radio Access (E-UTRA) Medium Access Control (MAC) protocol specification (Release 8), 43 pages.

3GPP TSG-RAN WG2 #63bis, Sep. 29-Oct. 3, 2008, Prague, Czech Republic, Agenda Item: 6.1.1.6, Source: LG Electronics, Inc., Issues on Multiple BSRs Memorandum for Discussion, R2-085798, 1 pages.

3GPP TSG-RAN WG2 Meeting #60bis (R2-080015), Sevilla, Spain, Jan. 14-18, 2008; Agenda Item; 5.1.1.5; Source: Nokia Corporation, Nokia Siemens Networks; Title: Criteria for Short and Long BSR; Document for: Discussion and Decision, 6 pages.

International Search Report of the International Searching Authority for Application No. PCT/CN2009/071404; mailed Aug. 6, 2009; Huawei Tech. Co. Ltd. (Chinese version included) 4 pages.

Korean Office Action (Partial Translation); "Notice to Submit a Response", relating to Application No. 10-2010-7013946; mailed Sep. 27, 2011, for Huawei Tech Co. Ltd. (Korean translation included) 6 pages.

Written Opinion of the International Search Authority for Int'l Application No. PCT/CN2009/071404, mailing date of Aug. 6, 2009, Huawei Technologies Co., Ltd., et al., 3 pages.

\* cited by examiner

METHOD AND DEVICE FOR SENDING A BUFFER STATUS REPORT

CROSS-REFERENCE TO RELATED APPLICATIONS

This application is a continuation of U.S. patent application Ser. No. 12/565,255, filed on Sep. 23, 2009, which is a continuation of International Patent Application No. PCT/CN2009/071404, filed on Apr. 22, 2009. The International Patent Application claims priority to Chinese Patent Application No. 200810066888.3, filed Apr. 26, 2008, both of which are hereby incorporated by reference in their entirety.

TECHNICAL FIELD

The present disclosure relates to mobile communication, and in particular, to a method for sending a buffer status report and a relevant device.

BACKGROUND

A Long Term Evolution (LTE) project is mainly directed to the mobile communication system that the $3^{rd}$ Generation Partnership Project (3GPP) Organization is preparing to enhance in the next ten years. In current LTE system, a base station performs centralized scheduling of all uplink transmissions from different terminals to improve channel utilization efficiency. The uplink dynamic scheduling includes the following steps.

Step 1: A terminal sends uplink scheduling reports, including the most important report, that is, a Buffer Status Report (BSR), and further including Power Headroom report etc, to a base station corresponding to timing or event triggering.

Step 2: The base station schedules resources for the terminals according to a certain policy based on available resources and uplink scheduling information of all terminals, and generates an authorization message for terminal uplink transmissions.

Step 3: The terminal sends the authorization message to the terminal.

Step 4: The terminal sends data and controls information according to the authorization message.

LTE system has three types of BSR according to different processing methods: Regular BSR, Periodic BSR and Padding BSR. In application, if the terminal triggers the sending of BSR and does not send the BSR to the network by utilizing uplink resources, the status of BSR is marked as pending.

If the data lately received by the buffer has a higher priority than the to-be-sent data in the buffer, or the service cell serving for the terminal has changed, the sending of Regular BSR would be triggered. At this time, if there are uplink resources available for sending, Regular BSR is generated and sent; if no uplink resources, but there are SR-PUCCH resources configured at the network, the terminal does not generate Regular BSR but marks the current status of BSR as pending and sends Scheduling Request (SR) by using SR-PUCCH resources; if there are no uplink resources and SR-PUCCH resources, the terminal does not generate Regular BSR but marks the current status of BSR as pending and sends SR by using Random Access Channel, RACH resources; when uplink resources are available for sending Regular BSR, the terminal generates and sends Regular BSR.

If the periodic timer configured in the terminal times out, the sending of Periodic BSR is triggered. At this time, if there are uplink resources for sending BSR, the terminal generates and sends the Periodic BSR; if there are no uplink resources for sending BSR, the terminal does not generate Periodic BSR but marks the current status of BSR as pending, waits for uplink resources for sending BSR and generates and sends Periodic BSR only when obtaining the uplink resources for sending Periodic BSR.

If there is still one BSR available after all to-be-sent data of the terminal is padded into the obtained uplink resources, the sending of a Padding BSR is triggered and, at this time, the terminal generates a Padding BSR and sends it as part of the uplink resources which have not been padded full.

However, in existing technical proposals, at a certain moment, if the sum of the BSR qualified for triggering the sending and the BSR marked as pending is greater than one, it may result in resource waste or system error and affect the resource utilization efficiency or system stability.

SUMMARY

A method for sending a buffer status report and a device are provided in an embodiment of the present disclosure to solve the problems of resource waste or system error caused when the sum of the BSR qualified for triggering the sending and the BSR marked as pending is greater than one.

A method for processing Buffer Status Reports is provided in an embodiment of the present disclosure. The method includes: determining a type priority sequence of BSRs; and selecting, according to the type priority sequence, a BSR for processing.

A method for processing Buffer Status Reports is provided in another embodiment of the present disclosure. The method includes: selecting a Regular BSR for processing if triggering conditions of sending procedure of at least two BSRs are met, and one of the following conditions is met.

The at least two BSRs include Regular BSR and Padding BSR.

The at least two BSRs include Regular BSR and Periodic BSR.

The at least two BSRs include Regular BSR, Periodic BSR and Padding BSR.

A user device is also provided in another embodiment of the present disclosure. The device includes: a setting unit, configured to set type priority sequence of Buffer Status Reports (BSRs); a selecting unit, configured to select a BSR according to the type priority sequence; and a processing unit, configured to process the BSR selected by the selecting unit.

In the process of implementing the embodiments of the present disclosure, the terminal may select and process one BSR when the sum of BSRs qualified for triggering the sending and BSRs marked as pending is greater than one. The present disclosure avoids the situations in which the sending of at least two BSRs are triggered at the same time and at least two BSRs are sent at one time, thus solving the resource waste problem. In addition, the present disclosure avoids the resource waste or system error in the situation in which the sum of BSRs qualified for triggering the sending and BSRs marked as pending is greater than one, thus improving the resource utilization efficiency or system stability.

BRIEF DESCRIPTION OF THE DRAWINGS

To facilitate description of the embodiments of the present disclosure or technical proposals of current technologies, a brief description of the drawings needed for the embodiments or current technical descriptions are given below. It is apparent that the drawings in the following descriptions are just some embodiments of the disclosure and those skilled in the art may make other drawings based on these without departing from the spirit and scope of the disclosure.

DETAILED DESCRIPTION

Embodiments of the present disclosure are clearly and completely described as follows in combination with the drawings in the embodiments of the present disclosure. It is apparent that the described embodiments are just parts of the present disclosure, not all embodiments. Those skilled in the art may make other embodiments without departing from the spirit and scope of the disclosure.

A method for sending a BSR is provided in an embodiment of the present disclosure. The method includes: determining a type priority sequence of the BSRs by a terminal and selecting and processing one BSR according to the type priority sequence. In this embodiment, resource waste or system error caused when the sum of the BSR qualified for triggering the sending and the BSR marked as pending is greater than one may be avoided, and the resource utilization efficiency or system stability may be improved.

Figure 1:
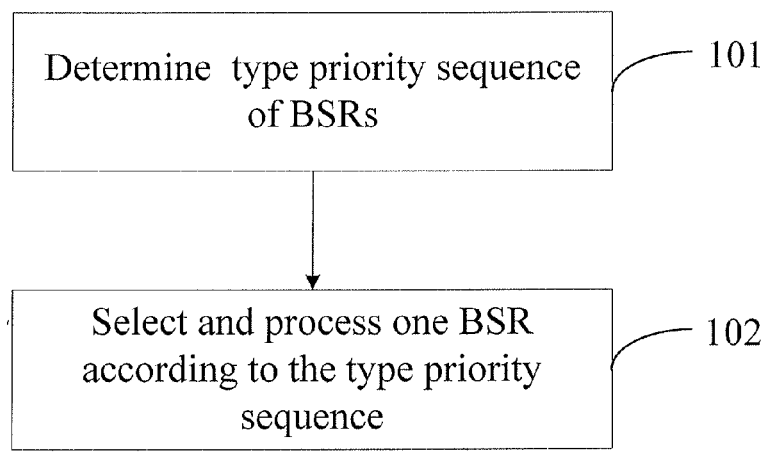
FIG. 1 is a simplified schematic diagram illustrating a method in an embodiment of the present disclosure.

FIG. 1 is a simplified schematic diagram illustrating a method in an embodiment of the present disclosure. Step 101, a user terminal determines the type priority sequence of BSRs, and Step 102, the user terminal selects a BSR for processing according to the type priority sequence. The point to be indicated is that the type priority sequence of BSRs may be set directly by the user terminal or determined by other factors, or relevant priority may be set for each type of BSR to form the type priority sequence of BSR. For example, the priority of Regular BSR, Periodic BSR and Padding BSR is set as 1, 2 and 3 to form the type priority sequence of BSR as Regular BSR>Periodic BSR>Padding BSR.

On the basis of a first method provided in an embodiment of the present disclosure, the terminal firstly determines the priority sequence of each type of BSR. When the triggering condition of sending procedure of at least one new BSR with different type from BSR marked as pending is met at a certain moment, the terminal selects the BSR with the highest type priority between BSR marked as pending and the new BSRs meeting the conditions for processing.

In the below first to fourth embodiments, the terminal determines in advance the priority sequence of each type of BSR as Regular BSR>Periodic BSR>Padding BSR.

In the first embodiment of the present disclosure, new data arrives at the buffer at the t10 moment and the priority of the new data is higher than the priority of to-be-sent data in the buffer. Then, the sending of Regular BSR is triggered. At this moment, if there are no uplink resources available for sending BSR and no SR-PUCCH resources configured at the network, the terminal does not generate Regular BSR but marks the current status of BSR as pending and sends SR to request uplink resources by utilizing RACH resources. At the t11 moment before the terminal obtains the uplink resources available for sending Regular BSR, the BSR periodic timer set in the terminal times out, which meets the condition of triggering the sending of a Periodic BSR. The terminal identifies the pending Regular BSR with the highest type priority according to a preset type priority sequence i.e. Regular BSR>Periodic BSR. The terminal does not trigger any sending of new BSR but continues to process the Regular BSR marked as pending, i.e. the terminal does not obtain the uplink resources available for sending Regular BSR at the t11 moment, so the terminal continues the started process of sending SR to obtain uplink resources. That is, the terminal waits for uplink resources available for sending BSR, or sends an SR by reutilizing RACH resources to obtain uplink resources again after the process of sending SR to obtain uplink resources fails.

In the second embodiment of the present disclosure, the periodic timer configured in the terminal times out at the t20 moment. Then, the sending of Periodic BSR is triggered and there are no uplink resources available for sending BSR, and the terminal does not generate Periodic BSR but marks the current status of BSR as pending and starts waiting for uplink resources available for sending BSR. At the t21 moment before the terminal obtains the uplink resources available for sending Periodic BSR, new data arrives at the buffer and the priority of the new data is higher than the priority of to-be-sent data in the buffer, which meets the condition of triggering the sending of a Regular BSR. The terminal identifies the Regular BSR qualified for triggering with the highest type priority according to a preset type priority sequence i.e. Regular BSR>Periodic BSR, then triggers the sending of a Regular BSR. At the t21 moment, the terminal has no uplink resources available for sending the Regular BSR and SR-PUCCH resources configured at the network, and then the terminal does not generate Regular BSR but marks the current status of BSR as pending and sends an SR by utilizing RACH resources to obtain uplink resources.

In the third embodiment of the present disclosure, the periodic timer configured in the terminal times out at the t30 moment. The sending of Periodic BSR is triggered and there are no uplink resources available for sending BSR and SR-PUCCH resources configured at the network, and the terminal does not generate Periodic BSR but marks the current status of BSR as pending and waits for uplink resources available for sending BSR. At the t31 moment, the terminal obtains the uplink resources available for sending a Periodic BSR and generates the Periodic BSR; at this moment, one BSR may also be sent after all to-be-sent data including the Periodic BSR is padded in the obtained uplink resources, which meets the condition of triggering the sending of a Regular BSR. The terminal identifies the pending Periodic BSR with the highest type priority according to a preset type priority sequence i.e. Periodic BSR>Padding BSR, and does not trigger any sending of new BSR but continues to process the pending Periodic BSR. At the t31 moment, the terminal does not generate Padding BSR but sends the Periodic BSR as the only BSR to the network. If the obtained uplink resources are not enough to send the Periodic BSR at the t31 moment, the terminal does not generate the Periodic BSR. And the current status of BSR is still pending and the terminal continues to wait for uplink resources available for sending BSR.

In the fourth embodiment of the present disclosure, new data arrives at the buffer at the t40 moment and the priority of the new data is higher than the priority of to-be-sent data in the buffer. The sending of Regular BSR is triggered. At this moment, there are no uplink resources available for sending BSR and no SR-PUCCH resources configured at the network, and the terminal does not generate Regular BSR but marks the current status of BSR as pending and starts the sending of SR by utilizing RACH resources. At the t41 moment before obtaining the uplink resources available for sending Regular BSR, the terminal obtains the uplink resources available for sending Regular BSR and generates Regular BSR. At this moment, one BSR may also be sent after all to-be-sent data including the Regular BSR are padded in the obtained uplink resources, which meets the condition of triggering the sending of a Padding BSR. The terminal identifies the pending Regular BSR with the highest type priority according to a preset type priority sequence, i.e. Regular BSR>Padding BSR, and does not trigger any sending of new BSR but continues to process the Regular BSR marked as pending, i.e. the terminal does not generate Padding BSR at the t41 moment but sends the Regular BSR as the only BSR to the network. If the obtained uplink resources are not enough to send Regular BSR at the t41 moment, the terminal does not generate Periodic BSR, and the current status of BSR is pending and the terminal continues to wait for uplink resources available for sending a BSR, or sends the SR by reutilizing RACH resources to obtain uplink resources after the process of sending SR to obtain uplink resources fails.

In the above first to fourth embodiments, at a certain moment, the sending of at least one new BSR different type from BSR marked as pending may be triggered, and the terminal selects a BSR with the highest type priority between the BSR marked as pending and the new BSRs meeting the conditions to process, which has solved the problems of resource waste and improved the resource utilization efficiency or system stability because there are no at least two BSRs sent at one time.

On the basis of a second method provided in an embodiment of the present disclosure, the terminal firstly determines the priority sequence of each type of BSR. At a certain moment, if the sending of at least one new BSR different from BSR marked as pending may be triggered, the terminal continues to process the BSR marked as pending.

In a fifth embodiment of the present disclosure, the terminal predetermines the priority sequence of each type of BSR as Regular BSR>Periodic BSR>Padding BSR. At the t50 moment, if new data arrives at the buffer and the priority of the new data is higher than the priority of the to-be-sent data in the buffer, the sending of Regular BSR is triggered. At this time, there are no uplink resources available for sending BSR and no SR-PUCCH resources configured at the network, and the terminal does not generate Regular BSR but marks the current status of BSR as pending and starts the sending of SR by utilizing RACH resources. At the t51 moment before the terminal obtains the uplink resources available for sending the Regular BSR, another new data arrives at the buffer and the priority of the new data is higher than the priority of to-be-sent data in the buffer. That is, the condition of triggering the sending of a BSR that is of the same type as the BSR marked as pending is met. In this case, the terminal continues to process the BSR marked as pending. That is, at the t51 moment, the terminal does not trigger the sending of a new Regular BSR but continues the started process of sending an SR to obtain uplink resources, that is, to wait for uplink resources available for sending the BSR, or the terminal uses the RACH resources again to obtain uplink resources if the process of sending an SR to obtain uplink resources fails.

In this embodiment, at a certain moment, the sending of a BSR may be triggered and the existed BSR marked as pending is of the same type of this BSR, or has the same type priority. Then, the terminal does not trigger the sending of new BSR but continues to process the BSR marked as pending, which has solved the problems of resource waste and improved the resource utilization efficiency or system stability.

On the basis of a third method in an embodiment of the present disclosure, the terminal firstly determines the priority sequence of each type of BSR, and selects a BSR with the highest type priority from at least two BSRs whose triggering condition of sending procedure is met at a certain moment and there is no BSR marked as pending.

In a sixth embodiment of the present disclosure, at the n-th subframe, new data arrives at the buffer and the priority of the new data is higher than the priority of to-be-sent data in the buffer, which meets the condition of triggering the sending of a Regular BSR. At this moment, the BSR periodic timer configured in the terminal times out, which meets the condition of triggering the sending of a Periodic BSR. Simultaneously, the terminal obtains uplink resources and one BSR may be still sent after all to-be-sent data including a BSR are padded into the obtained uplink resources, which meets the condition of triggering the sending of a Padding BSR. The terminal selects a Regular BSR with the highest type priority to process according to the preset type priority sequence i.e. Regular BSR>Periodic BSR>Padding BSR, that is, the terminal triggers the sending of a Regular BSR, and generates the Regular BSR in the n-th subframe.

In a seventh embodiment of the present disclosure, at the m-th subframe, the BSR periodic timer configured in the terminal times out, which meets the condition of triggering the sending of a Periodic BSR. Simultaneously, the terminal obtains uplink resources and one BSR may be still sent after all to-be-sent data including a BSR are padded into the obtained uplink resources, which meets the condition of triggering the sending of a Padding BSR. The terminal selects a Regular BSR with the highest type priority to process according to the preset type priority sequence, i.e. Periodic BSR>Padding BSR, that is, the terminal triggers the sending of a Periodic BSR, and generates the Regular BSR in the m-th subframe.

In the foregoing sixth and seventh embodiments, at a certain moment, if the triggering conditions of sending procedure of at least two BSRs are met and there is no BSR marked as pending, the terminal selects a BSR with the highest type priority from BSRs qualified for triggering to process, which has solved the problems of resource waste, avoided the system error caused by random trigger and process to the BSR by the terminal and improved the resource utilization efficiency or system stability.

In the methods provided in the foregoing embodiments of the present disclosure, if the sending of a BSR may be triggered but the terminal does not perform subsequent processing to the BSR, the sending of the eliminated BSR may not be triggered. It is understandable to those skilled in the art that the methods provided in the foregoing embodiments have substitute programs. That is, the terminal may trigger the sending of all BSRs qualified for triggering, identify BSRs according to the type priority sequence of the BSRs and select a BSR for post-processing, but the eliminated BSR the sending of which has been triggered is cancelled and not processed by the terminal. In the foregoing substitute program, the method of selecting to post-process BSR by the terminal is an analogue of the method provided in the foregoing embodiments, described as follows in the substitute program of the first embodiment.

An eighth embodiment of the present disclosure is the substitute program of the first embodiment, in which, the terminal first determines the priority sequence of each type of BSR. At the t80 moment, new data arrives at the buffer and the priority of the new data is higher than the priority of to-be-sent data in the buffer, which meets the condition of triggering the Regular BSR and the sending of the Regular BSR may be triggered. However, there are no uplink resources available for sending the BSR and no SR-PUCCH resources configured at the network at this moment. Therefore, the terminal does not generate the Regular BSR but marks the current status of the BSR as pending and sends the SR by utilizing RACH resources. At the t81 moment before the terminal obtains the uplink resources available for sending the Regular BSR, the periodic timer configured in the terminal times out, which meets the condition of triggering the Periodic BSR and the sending of a Periodic BSR may be triggered. Therefore, there are two types of BSR marked as pending at the t81 moment. The terminal processes the Regular BSR with the higher type priority according to the preset type priority sequence, i.e. Regular BSR>Periodic BSR. The Periodic BSR not selected for post-process is cancelled and the terminal does not process the Periodic BSR.

Figure 2:
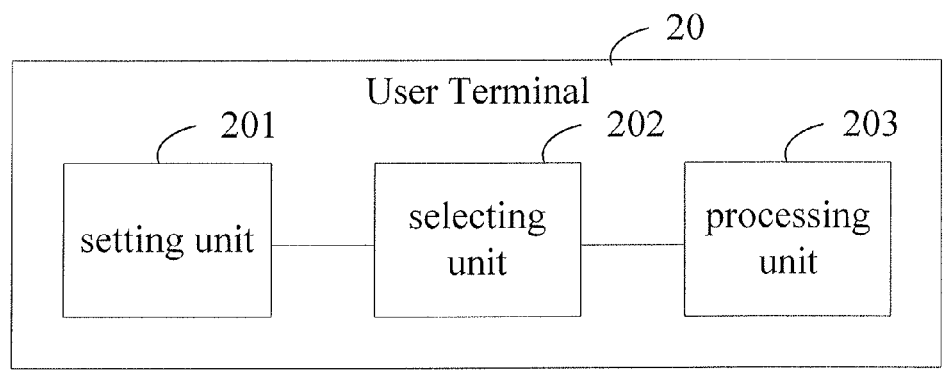
FIG. 2 is a simplified schematic diagram illustrating a structure of a user terminal in another embodiment of the present disclosure.

As shown in FIG. 2, a user terminal 20 is provided in a ninth embodiment of the present disclosure. The user terminal 20 includes: a setting unit 201, configured to set a type priority sequence of BSRs; a selecting unit 202, configured to select a BSR based on the type priority sequence; and a processing unit 203, configured to process the BSR selected by the selecting unit 202.

The point to be indicated is that the setting unit 201 may also set the relevant priority for each type of BSRs to form the type priority sequence of the BSRs and the selecting unit 202 may select a BSR according to the type priority set by the setting unit 201.

Further, when the triggering condition of the sending of more than one BSR is met, the selecting unit 202 may select a BSR with the highest type priority from the at least two BSRs.

Further, when the triggering condition of the sending of at least one BSR is met and there are at least two BSRs marked as pending, the selecting unit 202 may select the BSR with the highest type priority from the BSRs marked as pending and the foregoing at least one BSR.

Further, when the triggering condition of the sending of at least one BSR is met, if a BSR marked as pending exists, and the type priority of a BSR with the highest type priority from the at least one BSR is the same as the type priority of the BSR marked as pending, the selecting unit 202 may select the BSR marked as pending.

Further, the processing unit 203 may also be configured to trigger the sending of the BSR qualified for triggering if the triggering condition of the sending of BSR is met.

The user device provided in the embodiment may select a BSR for processing when the sum of the BSR qualified for triggering the sending and the BSR marked as pending is greater than one, which has solved the problems of resource waste and improved the resource utilization efficiency or system stability because there are no at least two BSRs sent at one time It is understandable to those skilled in the art that all or part of the steps in the foregoing embodiments may be performed through hardware instructed by a program. The program may be stored in a computer-readable storage medium such as magnetic disk, compact disk and Read-Only-Memory (ROM)/Random Access Memory (RAM). When being executed, the program performs these steps.

Although the foregoing disclosed are just some embodiments of the present disclosure, the disclosure is not limited to such embodiments. The disclosure is intended to cover the modifications and variations provided that they fall in the scope of protection defined by the following claims or their equivalents.

What is claimed is:

1. A method for processing buffer status reports (BSRs), comprising:
   determining by a user device, a type priority sequence of different type BSRs;
   determining a first triggering condition of sending procedure of a first BSR and a second triggering condition of sending procedure of a second BSR have been met, wherein the first BSR has a higher priority type than the second BSR; and
   processing firstly, by the user device, the first BSR prior to the second BSR according to the type priority sequence;
   wherein the different type BSRs comprise: a regular BSR, a periodic BSR and a padding BSR; and
   wherein the type priority sequence of the at least two BSRs corresponds to a type priority of the regular BSR being higher than a type priority of the periodic BSR, and the type priority of the periodic BSR being higher than a type priority of the padding BSR.

2. The method according to claim 1, wherein one of the first BSR and the second BSR has been marked as pending, another of the first BSR and the second BSR is a new BSR.

3. The method according to claim 1,
   wherein the first BSR has been marked as pending and a type or a type priority of at least one BSR whose triggering condition is met is the same as that of the first BSR marked as pending.

4. The method according to claim 1, further comprising:
   sending a scheduling request (SR) to request an uplink resource if there are no the uplink resources available for sending any one BSR; and
   obtaining the uplink resource.

5. The method according to claim 1, further comprising:
   determining a triggering condition of sending a BSR corresponding to new data is met if the new data arrives at a buffer of the user device, wherein a type or a type priority of the BSR corresponding to the new data is different from that of a BSR corresponding to to-be-sent data in the buffer;
   marking a current status of the BSR corresponding to the new data as pending if there are no uplink resource available for sending any one of the BSR corresponding to the new data and the BSR corresponding to to-be-sent data in the buffer;
   determining a triggering condition of sending the BSR corresponding to the to-be-sent data in the buffer is met before the user device obtains the uplink resource, wherein the first BSR is one of the BSR corresponding to the new data and the BSR corresponding to the to-be-sent data, and the second BSR is another of the BSR corresponding to the new data and the BSR corresponding to the to-be-sent data;
   sending a scheduling request (SR) to request the uplink resource;
   obtaining the uplink resource; and
   processing firstly according to the type priority sequence the first BSR with the higher type priority from the BSR corresponding to the new data and the BSR corresponding to to-be-sent data in the buffer for processing firstly.

6. A method for processing buffer status reports (BSRs), comprising:
   processing firstly, by a user device, a regular BSR if a triggering condition of sending procedure of each of at least two BSRs is met,
   wherein, the at least two BSRs include the regular BSR and at least one of a padding BSR and a periodic BSR;
   wherein a type priority of the regular BSR is higher than a type priority of the periodic BSR, and the type priority of the periodic BSR is higher than a type priority of the padding BSR.

7. The method according to claim 6, further comprising:
   sending, by the user device, a scheduling request (SR) via random access channel (RACH) resources if there are no uplink resources available for sending BSR.

8. The method according to claim 6, further comprising:
sending, by the user device, the regular BSR via uplink resources if there are the uplink resources available for sending BSR.

9. A user device, comprising:
a processor configured to determine a type priority sequence of different type buffer status reports (BSRs); and determine a first triggering condition of sending procedure of a first BSR and a second triggering condition of sending procedure of a second BSR have been met, wherein the first BSR has a higher priority type than the second BSR; and
a transmitter, configured to send a scheduling request (SR) to request an uplink resource:
wherein the processor is further configured to obtain the uplink resource and process firstly the first BSR prior to the second BSR according to the type priority sequence;
wherein the different type BSRs comprise: a regular BSR, a periodic BSR and a padding BSR; and
wherein the type priority sequence of the at least two BSRs corresponds to a type priority of the regular BSR being higher than a type priority of the periodic BSR, and the type priority of the periodic BSR being higher than a type priority of the padding BSR.

10. The user device according to claim 9, wherein one of the first BSR and the second BSR has been marked as pending, another of the first BSR and the second BSR is a new BSR.

11. The user device according to claim 9, wherein the first BSR has been marked as pending and a type or a type priority of at least one BSR whose triggering condition is met is the same as that of the first BSR marked as pending.

12. The user device according to claim 9, wherein:
the processor is further configured to determining a triggering condition of sending a BSR corresponding to new data is met if the new data arrives at a buffer of the user device, wherein a type or a type priority of the BSR corresponding to the new data is different from that of a BSR corresponding to to-be-sent data in the buffer; mark a current status of the BSR corresponding to the new data as pending if there are no uplink resource available for sending any one of the BSR corresponding to the new data and the BSR corresponding to to-be-sent data in the buffer; determine a triggering condition of sending the BSR corresponding to the to-be-sent data in the buffer is met before the user device obtains the uplink resource, wherein the first BSR is one of the BSR corresponding to the new data and the BSR corresponding to the to-be-sent data, and the second BSR is another of the BSR corresponding to the new data and the BSR corresponding to the to-be-sent data; obtain the uplink resource; and processing firstly according to the type priority sequence the first BSR with the higher type priority from the BSR corresponding to the new data and the BSR corresponding to to-be-sent data in the buffer for processing firstly.

13. A user equipment, comprising:
a processor configured to process firstly a regular buffer status report (BSR) if a triggering condition of sending procedure of each of at least two BSRs is are met, wherein,
the at least two BSRs include the regular BSR and at least one of a padding BSR and a periodic BSR; wherein a type priority of the regular BSR is higher than a type priority of the periodic BSR, and the type priority of the periodic BSR is higher than a type priority of the padding BSR.

14. The user device according to claim 13, further comprising:
a transmitter, configured to send a scheduling request (SR) via random access channel (RACH) resources if there are no uplink resources available for sending BSR.

15. A non-transitory machine-readable storage medium having stored thereon, a computer program comprising at least one code section for distributing data, the at least one code section being executable by a user device for causing the user device to perform acts of:
determining a type priority sequence of different type buffer status reports (BSRs);
determining a first triggering condition of sending procedure of a first BSR and a second triggering condition of sending procedure of a second BSR have been met, wherein the first BSR has a higher priority type than the second BSR; and
processing firstly the first BSR prior to the second BSR according to the type priority sequence;
wherein the different type BSRs comprise: a regular BSR, a periodic BSR and a padding BSR; and
wherein the type priority sequence of the at least two BSRs corresponds to a type priority of the regular BSR being higher than a type priority of the periodic BSR, and the type priority of the periodic BSR being higher than a type priority of the padding BSR.

16. The non-transitory machine-readable storage medium of claim 15, wherein one of the first BSR and the second BSR has been marked as pending, another of the first BSR and the second BSR is a new BSR.

17. The non-transitory machine-readable storage medium of claim 15, wherein the first BSR has been marked as pending and a type or a type priority of at least one BSR whose triggering condition is met is the same as that of the first BSR marked as pending.

18. The non-transitory machine-readable storage medium of claim 15, wherein the at least one code section being executable by the user device further causes the user device to perform a further acts of:
determining a triggering condition of sending a BSR corresponding to new data is met if the new data arrives at a buffer of the user device, wherein a type or a type priority of the BSR corresponding to the new data is different from that of a BSR corresponding to to-be-sent data in the buffer;
marking a current status of the BSR corresponding to the new data as pending if there are no uplink resource available for sending any one of the BSR corresponding to the new data and the BSR corresponding to to-be-sent data in the buffer;
determining a triggering condition of sending the BSR corresponding to the to-be-sent data in the buffer is met before the user device obtains the uplink resource, wherein the first BSR is one of the BSR corresponding to the new data and the BSR corresponding to the to-be-sent data, and the second BSR is another of the BSR corresponding to the new data and the BSR corresponding to the to-be-sent data;
sending a scheduling request (SR) to request the uplink resource;
obtaining the uplink resource; and
processing firstly according to the type priority sequence, the first BSR with the higher type priority from the BSR corresponding to the new data and the BSR corresponding to to-be-sent data in the buffer for processing firstly.

19. A non-transitory machine-readable storage medium having stored thereon, a computer program comprising at least one code section for distributing data, the at least one code section being executable by a user device for causing the user device to perform acts of:

processing firstly a regular buffer status report (BSR) if a triggering condition of sending procedure of each of at least two BSRs is met, wherein:

the at least two BSRs include the regular BSR and at least one of a padding BSR and a periodic BSR; wherein a type priority of the regular BSR is higher than a type priority of the periodic BSR, and the type priority of the periodic BSR is higher than a type priority of the padding BSR.

\* \* \* \* \*